United States Patent [19]
Lawther et al.

[11] Patent Number: 5,598,239
[45] Date of Patent: Jan. 28, 1997

[54] CASSETTE RETAINING APPARATUS

[75] Inventors: Joel S. Lawther; Anthony DiRisio, both of Rochester, N.Y.

[73] Assignee: Eastman Kodak Company, Rochester, N.Y.

[21] Appl. No.: 419,339

[22] Filed: Apr. 10, 1995

[51] Int. Cl.⁶ .................................................. G03B 17/26
[52] U.S. Cl. ........................................ 396/538; 396/512
[58] Field of Search ...................... 354/202, 275, 354/288

[56] References Cited

U.S. PATENT DOCUMENTS

| | | | |
|---|---|---|---|
| 5,142,316 | 8/1992 | Tanii et al. | 354/212 |
| 5,159,365 | 10/1992 | Takahashi et al. | 354/21 |
| 5,323,201 | 6/1994 | Richiuso et al. | 354/288 |
| 5,394,213 | 2/1995 | Hazama et al. | 354/288 |
| 5,432,573 | 7/1995 | Lawther et al. | 354/174 |
| 5,477,295 | 12/1995 | Lawther et al. | 354/174 |
| 5,483,314 | 1/1996 | Lawther et al. | 354/174 |

*Primary Examiner*—Howard B. Blankenship
*Assistant Examiner*—John Chizmar
*Attorney, Agent, or Firm*—Roger A. Fields

[57] ABSTRACT

A cassette retaining apparatus comprises a holding chamber into which a film cassette is to be inserted and from which the cassette may be removed, and retaining means biased into engagement with the film cassette to retain the cassette in the chamber. The retaining means exerts one force to be biased into engagement with the film cassette, which force incidentally resists insertion of the cassette into the chamber though is relatively weak to make it easy to manually insert the cassette into the chamber, and exerts another force to be biased into engagement with the film cassette, which force incidentally resists removal of the cassette from the chamber and is relatively strong to make it difficult for the cassette to be unintentionally dislodged from the chamber.

1 Claim, 5 Drawing Sheets

CASSETTE RETAINING APPARATUS

CROSS-REFERENCE TO RELATED APPLICATION

Reference is made to commonly assigned application Ser. No. 08/075,969, entitled APPARATUS FOR CONTROLLING THE MOVEMENT OF A FILM CARTRIDGE FROM A LOADING CHAMBER IN A CAMERA and filed Jun. 11, 1993 in the names of Joel S. Lawther and Donald P. McGinn, now U.S. Pat. No. 5,430,515, issued Jul. 4, 1995.

The cross-referenced application is incorporated in this application.

FIELD OF THE INVENTION

The invention relates generally to the field of photography, and in particular to a cassette retaining apparatus such as included in a camera intended to be used with a film cassette. More specifically, the invention relates to a cassette retaining apparatus comprising a holding chamber into which a film cassette is to be inserted and from which the cassette may be removed, and retaining means biased into engagement with the film cassette to retain the cassette in the chamber.

BACKGROUND OF THE INVENTION

The cross-referenced application, now U.S. Pat. No. 5,430,515, discloses a cassette retaining apparatus comprising a holding chamber into which a film cassette is to be inserted and from which the cassette may be removed, and retaining means biased into engagement with the film cassette to retain the cassette in the chamber. The retaining means includes a retaining piece supported for translation into and out of a closed-end groove in the cassette to engage and release the cassette, and a helical compression spring which continuously urges the retaining piece to be translated into the groove to engage the cassette. When the cassette is inserted into the chamber, the cassette first depresses the retaining piece out of its way contrary to the urging of the spring. However, as the groove is positioned opposite the retaining piece, the spring then urges the retaining piece to drop into the groove. When the cassette is removed from the chamber, the cassette depresses the retaining piece contrary to the urging of the spring to eject the retaining piece from the groove to disengage the cassette. Thus, the spring provides only one force to bias the retaining piece into engagement with the cassette, which force equally resists insertion of the cassette in the chamber and removal of the cassette from the chamber. It is good for the force to be relatively strong to urge the retaining piece into the groove to make it difficult for the cassette to be unintentionally dislodged from the chamber. However, it is a drawback that the force makes it equally difficult for the cassette to depress the retaining piece out of its way during insertion of the cassette into the chamber.

SUMMARY OF THE INVENTION

A cassette retaining apparatus comprising a holding chamber into which a film cassette is to be inserted and from which the cassette may be removed, and retaining means biased into engagement with the film cassette to retain the cassette in the chamber, is characterized in that:

the retaining means has elastic means for exerting one force to be biased into engagement with the film cassette, which force incidentally resists insertion of the cassette into the chamber though is relatively weak to make it easy to manually insert the cassette into the chamber, and for exerting another force to be biased into engagement with the film cassette, which force incidentally resists removal of the cassette from the chamber and is relatively strong to make it difficult for the cassette to be unintentionally dislodged from the chamber.

DETAILED DESCRIPTION OF THE INVENTION

The invention is disclosed as being embodied preferably in a camera. Because the features of a camera are generally known, the description which follows is directed in particular only to those elements forming part of or cooperating directly with the disclosed embodiment. It is to be understood, however, that other elements may take various forms known to a person of ordinary skill in the art.

Figure 1:
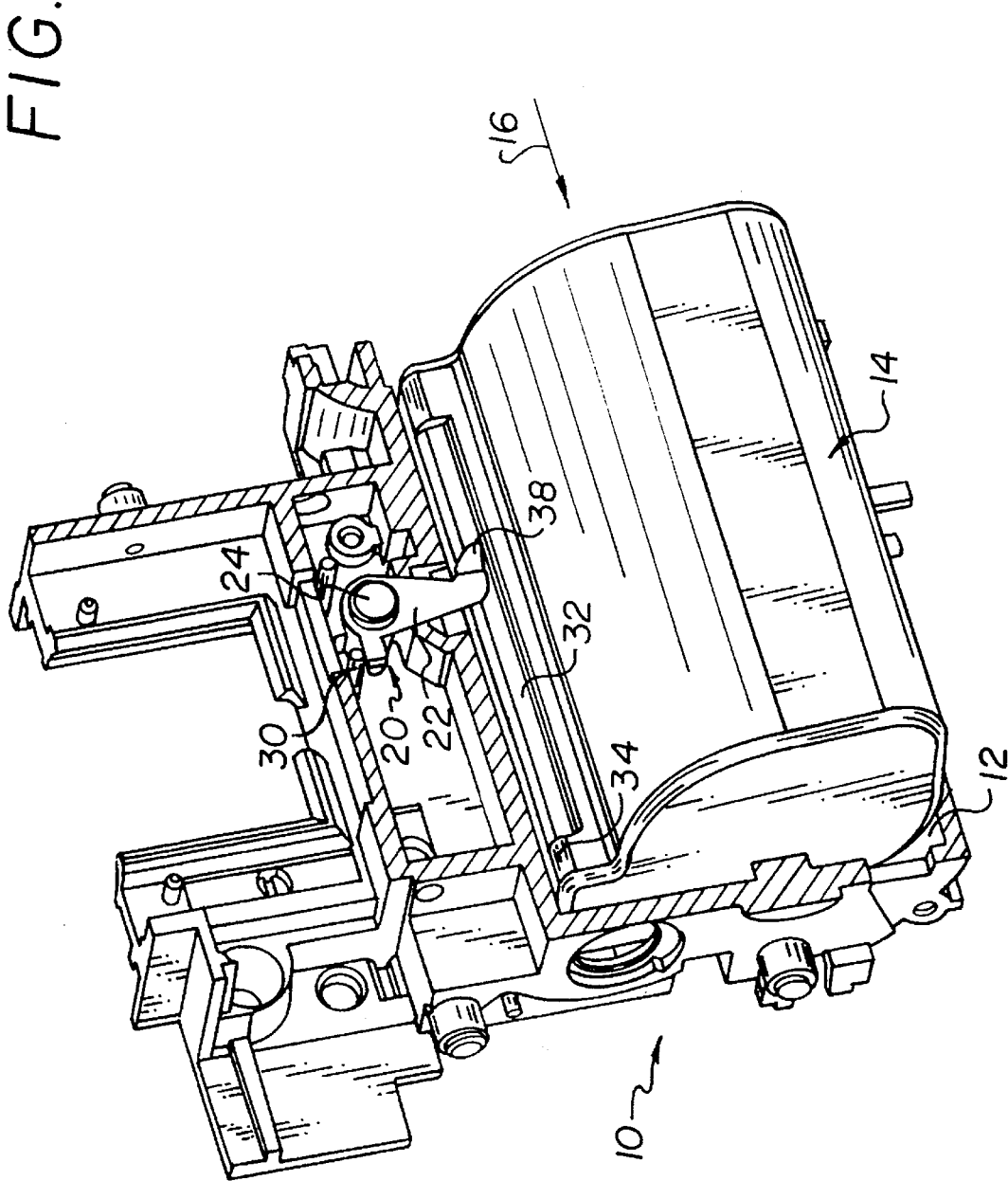
FIG. 1 is a perspective view, partly in section, of a cassette retaining apparatus according to a preferred embodiment of the invention, showing a film cassette retained in a holding chamber.
Figure 2:
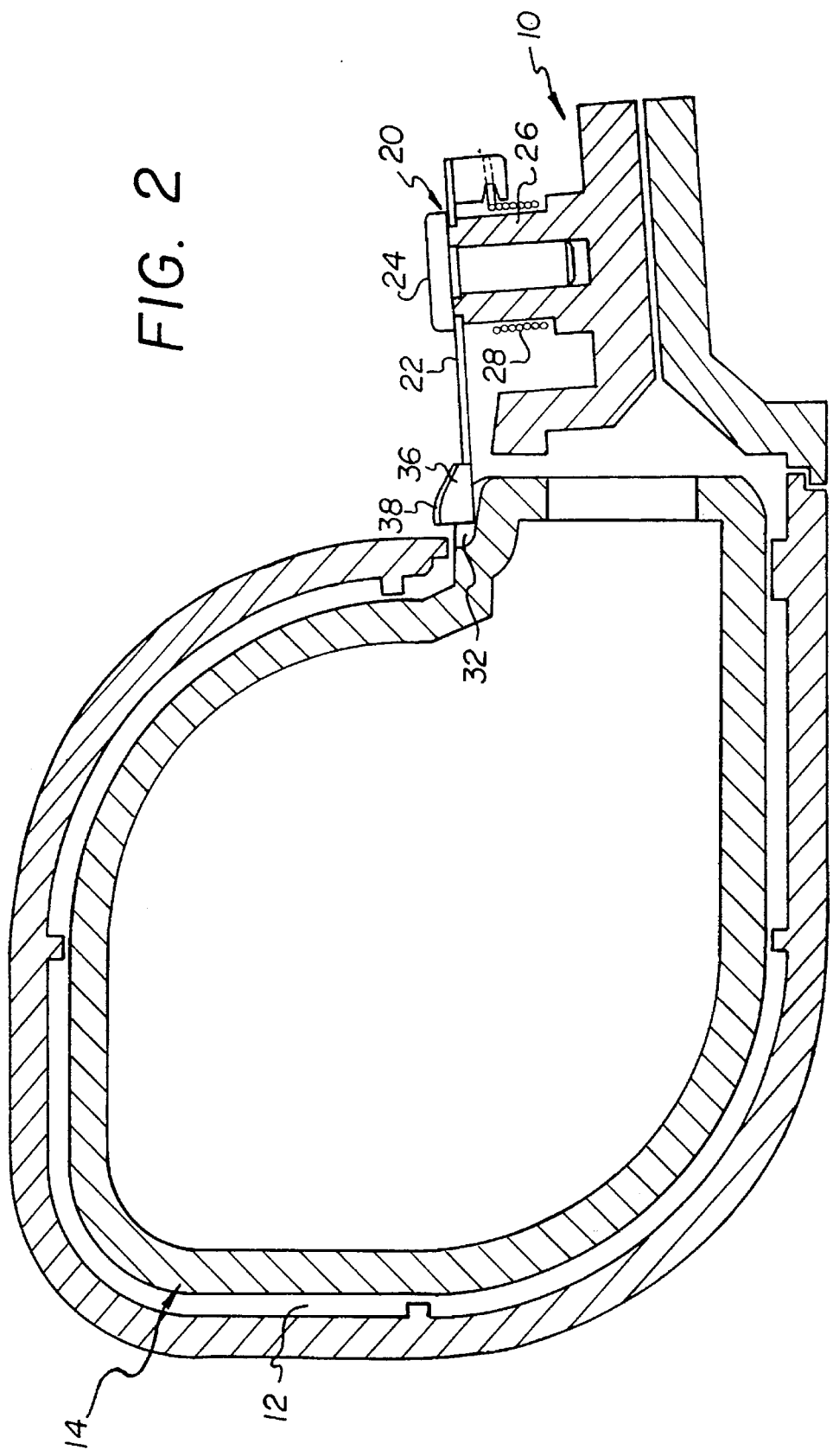
FIG. 2 is a cross-sectional view similar to FIG. 1.
Figure 3:
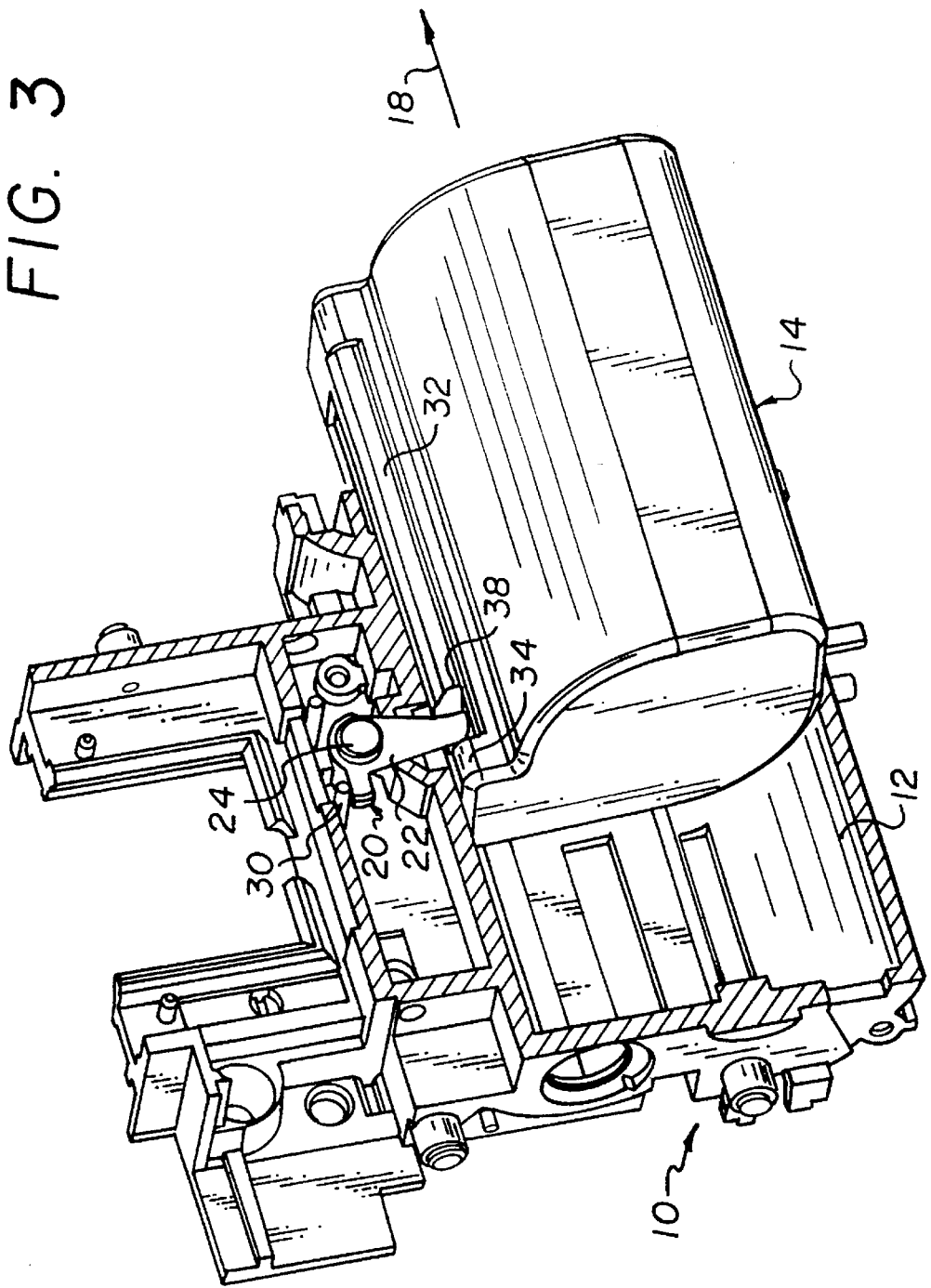
FIGS. 3 and 4 are perspective views, partly in section, similar to FIG. 1, showing removal of the cassette from the chamber.
Figure 4:
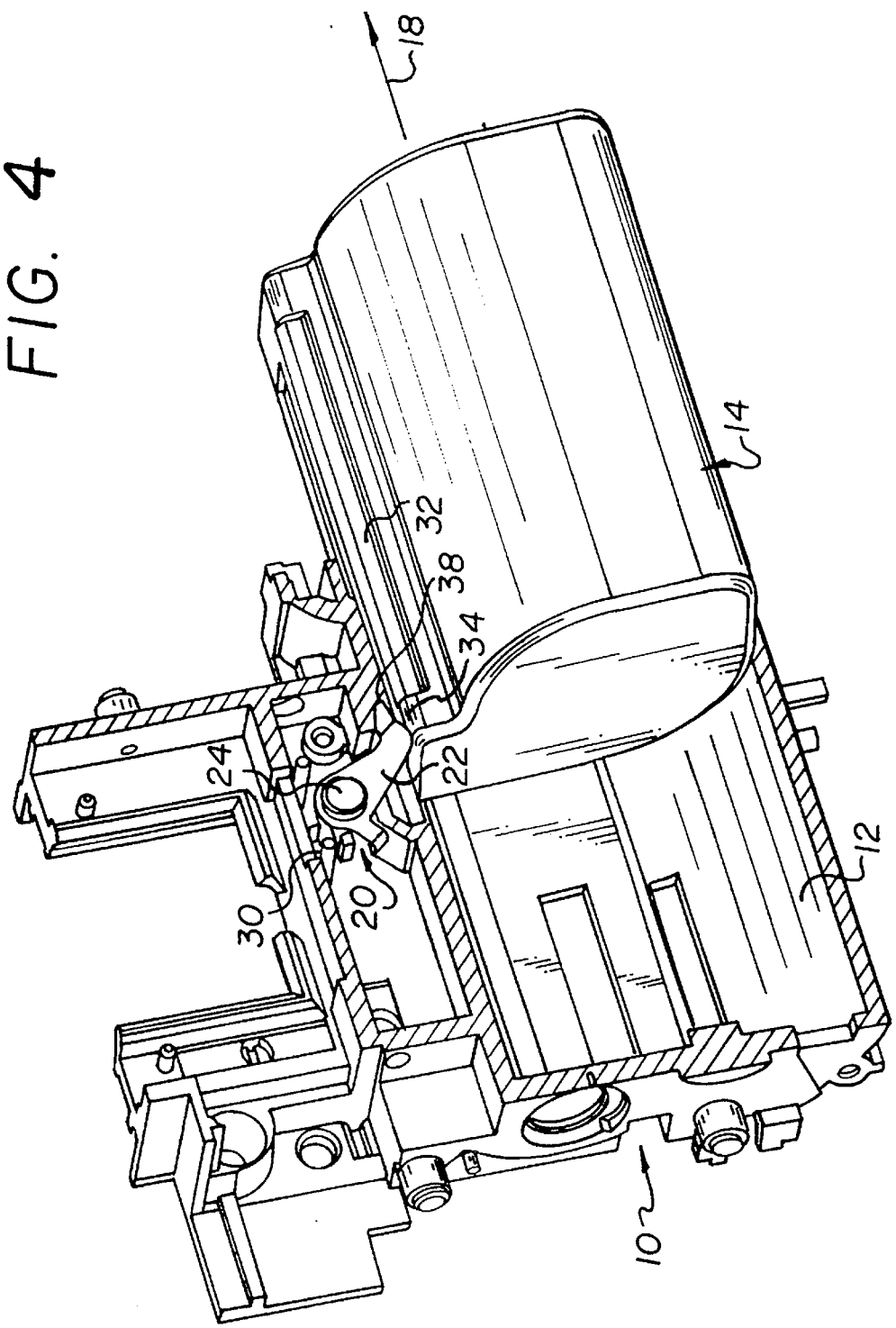

Referring now to the drawings, FIGS. 1–4 show a cassette retaining apparatus 10 comprising a holding chamber 12 into which a film cassette 14 is to be inserted in the direction of the arrow 16 in FIG. 1 and from which the cassette may be removed in the direction of the arrow 18 in FIGS. 3 and 4, and retaining means 20 biased into engagement with the cassette to retain the cassette in the chamber.

The retaining means 20 includes a retaining piece 22 which is held via a pin-head 24 for pivotal movement about a fixed post 26. See FIG. 2. A torsion spring 28 urges the retaining piece 22 to pivot clockwise in FIG. 1 against a stop 30. The retaining piece 22 is intended to be received in an exterior cavity in the form of a closed-end groove 32 in the cassette to engage the cassette to retain the cassette in the chamber 12.

Figure 5:
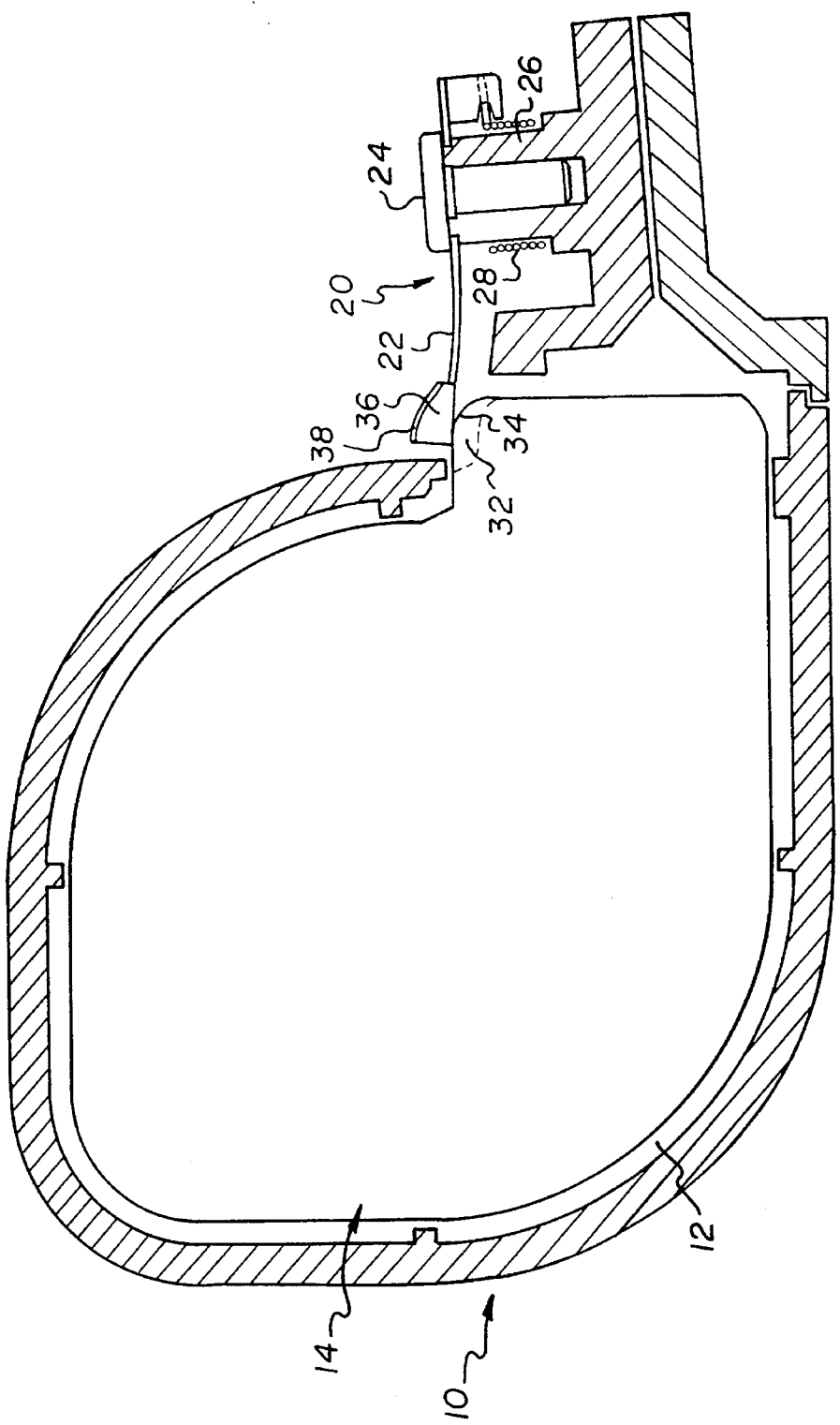
FIG. 5 is a cross-sectional view similar to FIG. 2, showing insertion of the cassette into the chamber.

The retaining piece 22 is resiliently flexible and, therefore, has an inherent bias. When the cassette 14 is inserted in the chamber 12, an end projection 34 of the cassette is initially moved against an underside 36 of an inclined tab 38 of the retaining piece 22 to flex or lift the retaining piece out of the way of the cassette in opposition to the inherent bias of the retaining piece. See FIG. 5. Consequently, the retaining piece 22 provides some resistance to insertion of the cassette 14 into the chamber 12. However, this resistance is relatively weak to make it easy to begin to insert the cassette 14 in the chamber. Then, as the end projection 34 of the cassette 14 is moved from beneath the inclined tab 38 and the groove 32 in the cassette is positioned beneath the inclined tab as shown in FIG. 3, the retaining piece 22 is allowed to recover its original shape and drop into the groove consistent with its inherent bias.

When the cassette 14 is removed from the chamber 12 as shown in FIGS. 3 and 4, the end projection 34 of the cassette is moved against the retaining piece 22 to pivot the retaining piece counter-clockwise in FIG. 3, first out of the groove 32 in the cassette and then out of the way of the end projection, in opposition to the urging of the spring 28. The spring 28 obviously provides some resistance to removal of the cassette 14 from the chamber. This resistance is relatively strong to make it difficult for the cassette 14 to be unintentionally dislodged from the chamber 12.

The invention has been described with reference to a preferred embodiment. However, it will be appreciated that variations and modifications can be effected by a person of ordinary skill in the art without departing from the scope of the invention. For example, the retaining piece 22 instead of being flexed out of the way of the end projection 34 of the cassette 14, during insertion of the cassette into the chamber 12, could be axially translated or tilted out of the way. Thus, the retaining piece 22 could be rigid rather than flexible.

PARTS LIST 10. cassette retaining apparatus
12. holding chamber
14. film cassette
16. insertion indicating arrow
18. removal indicating arrow
20. retaining means
22. retaining piece
24. pin-head
26. post
28. torsion spring
30. stop
32. cavity groove
34. end projection
36. tab underside
38. inclined tab

We claim:

1. A cassette retaining apparatus comprising a holding chamber into which a film cassette is to be inserted and from which the cassette may be removed, and retaining means biased into engagement with the film cassette to retain the cassette in said chamber, is characterized in that:

said retaining means has elastic means for exerting a first force to be biased into engagement with the film cassette, which force incidentally resists insertion of the cassette into said chamber though is weak enough to make it easy to manually insert the cassette into the chamber, and for exerting a second force to to manually insert the cassette into the chamber, and for exerting a second force to be biased into engagement with the film cassette, which force incidentally resists removal of the cassette from the chamber and is stronger than the first force to make it difficult for the cassette to be unintentionally dislodged from the chamber;

said elastic means includes a pivotable retaining piece which is resiliently flexible in order to exert the first force and, when the film cassette is inserted in said chamber, to first permit the cassette to flex said retaining piece out of the way of the cassette in opposition to that force and to then permit the retaining piece to receiver its original shape in an exterior cavity in the cassette to engage the cassette, and which is coupled with a separate spring to be pivotally spring-urged in order to exert the second force to maintain the retaining piece in the exterior cavity and when the cassette is removed from the chamber, to permit the cassette, to pivot the retaining piece out of the cavity to disengage the cassette in opposition to that force.

* * * * *

UNITED STATES PATENT AND TRADEMARK OFFICE
CERTIFICATE OF CORRECTION

PATENT NO. : 5,598,239
DATED : January 28, 1997
INVENTOR(S) : Joel S. Lawther, et al It is certified that error appears in the above-indentified patent and that said Letters Patent is hereby corrected as shown below:

Column 4, line 12         After "force", delete "to", second occurance.
Column 4, line 25,        Delete "receiver" and insert --recover.

Signed and Sealed this

Nineteenth Day of August, 1997

Attest:

BRUCE LEHMAN

*Attesting Officer*          *Commissioner of Patents and Trademarks*